US012218400B2

(12) United States Patent
Ueda

(10) Patent No.: US 12,218,400 B2
(45) Date of Patent: Feb. 4, 2025

(54) ANTENNA DEVICE

(71) Applicant: Mitsubishi Electric Corporation, Tokyo (JP)

(72) Inventor: Taro Ueda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/691,894

(22) PCT Filed: Dec. 27, 2022

(86) PCT No.: PCT/JP2022/048287
§ 371 (c)(1),
(2) Date: Mar. 14, 2024

(87) PCT Pub. No.: WO2023/127899
PCT Pub. Date: Jul. 6, 2023

(65) Prior Publication Data
US 2024/0387975 A1 Nov. 21, 2024

(30) Foreign Application Priority Data
Dec. 28, 2021 (JP) ................................. 2021-213629

(51) Int. Cl.
*H01Q 1/28* (2006.01)
*H01Q 1/02* (2006.01)
(Continued)

(52) U.S. Cl.
CPC ................. *H01Q 1/02* (2013.01); *H01Q 1/28* (2013.01); *H01Q 1/42* (2013.01); *H01Q 21/06* (2013.01)

(58) Field of Classification Search
CPC .. H01Q 1/02; H01Q 1/28; H01Q 1/42; H01Q 21/06
See application file for complete search history.

(56) References Cited

U.S. PATENT DOCUMENTS 11,522,279 B1 * 12/2022 Krüger ..................... H01Q 1/02
2015/0130672 A1 5/2015 Cordone
(Continued)

FOREIGN PATENT DOCUMENTS

JP 2003-298270 A 10/2003
JP 2016-539606 A 12/2016
(Continued)

OTHER PUBLICATIONS

Decision to grant mailed on Aug. 1, 2023, received for JP Application 2023-535723, 03 pages including English Translation.
(Continued)

*Primary Examiner* — Hai V Tran
*Assistant Examiner* — Michael M Bouizza
(74) *Attorney, Agent, or Firm* — XSENSUS LLP

(57) ABSTRACT

The antenna device includes: an array antenna including an antenna board on which a plurality of element antennas is mounted on one surface and an integrated circuit is mounted on an other surface; a power supply including a power supply board on which a power supply component is mounted; a base supporting the antenna board in such a manner that the integrated circuit is connected to one surface of base, supporting the power supply board in such a manner that the power supply component is connected to an other surface of base, and to the base heat generated by the integrated circuit and the power supply component connected to the base being transferred; a mount supporting the base, being fixed to a moving body, and to the mount heat being transferred from the base; a radome; and a skirt dissipating heat transferred from the mount.

12 Claims, 5 Drawing Sheets

(51) Int. Cl.
*H01Q 1/42* (2006.01)
*H01Q 21/06* (2006.01)

(56) References Cited

U.S. PATENT DOCUMENTS

| | | | | |
|---|---|---|---|---|
| 2021/0126351 | A1* | 4/2021 | Hou | H01Q 1/02 |
| 2022/0013895 | A1 | 1/2022 | Nagase | |
| 2022/0223992 | A1 | 7/2022 | Ueda | |
| 2022/0354020 | A1 | 11/2022 | Purpus et al. | |
| 2023/0087437 | A1* | 3/2023 | Nagase | H01Q 1/42 343/713 |

FOREIGN PATENT DOCUMENTS

| | | | |
|---|---|---|---|
| WO | 2015/070120 | A1 | 5/2015 |
| WO | 2020/136861 | A1 | 7/2020 |
| WO | 2020/261706 | A1 | 12/2020 |
| WO | 2021/046527 | A1 | 3/2021 |

OTHER PUBLICATIONS

International Search Report and Written Opinion mailed on Mar. 20, 2023, received for PCT Application PCT/JP2022/048287, filed on Dec. 27, 2022, 08 pages including English Translation.

* cited by examiner

ANTENNA DEVICE

CROSS-REFERENCE TO RELATED APPLICATIONS

This application is based on PCT filing PCT/JP2022/048287, filed Dec. 27, 2022, which claims priority to Japanese Patent Application No. 2021-213629, filed Dec. 28, 2021, the entire contents of each are incorporated herein by reference.

TECHNICAL FIELD

The present disclosure relates to an antenna device mounted on a moving body.

BACKGROUND ART

In an antenna device mounted on a moving body such as an aircraft for satellite communication, it is important to reduce or minimize an increase in air resistance caused by mounting the antenna device. In a moving body, particularly an aircraft, fuel consumption deteriorates as air resistance increases. In order to minimize the increase in air resistance, it is necessary to reduce the height and cross-sectional area of the antenna device as viewed in a direction from the nose side (nose direction). An antenna device using a phased array technique that changes the orientation direction electrically has been proposed in order to reduce the height and cross-sectional area as viewed in the nose direction (see, for example, Patent Literature 1). In Patent Literature 1, the phased array technique is used, so that the height of the antenna device can be reduced as compared with a case of using a mechanical drive technique. The phased array antenna device is required to have high heat dissipation performance, because the heat generation density of an antenna is increased as compared with an antenna device using the mechanical drive technique. Phased array antenna devices include an antenna device in which exhaust heat from the antenna device is cooled by air using a heat pipe and a radiating fin provided in the heat pipe (see, for example, Patent Literature 2).

CITATION LIST

Patent Literature

PTL 1: Japanese Patent Laid-Open No. 2003-298270
PTL 2: Japanese Patent Laid-Open No. 2016-539606

SUMMARY OF INVENTION

Technical Problem

In the antenna device described in Patent Literature 1, the antenna is covered with a radome, and is not exposed to the outside air directly. In order to cool the antenna, it is necessary to provide a cooling device such as a fan inside the radome. Since the cooling device requires a space, there exists a problem that it is difficult to reduce the height of the antenna device. The antenna device described in Patent Literature 2 also needs a space for providing a heat pipe inside the radome in order to cool the antenna. The antenna device described in Patent Literature 2 has a problem that the height and cross-sectional area of the antenna device as viewed in the nose direction increase by the space required for the heat pipe.

The present disclosure has been made to solve the above problems, and an object of the present disclosure is to obtain an antenna device capable of obtaining higher heat dissipation performance than before without increasing the height of the antenna device.

Solution to Problem

An antenna device according to the present disclosure includes: an array antenna including a plurality of element antennas, an integrated circuit to operate the plurality of element antennas, and an antenna board on which the plurality of element antennas is mounted on one surface and the integrated circuit is mounted on an other surface that is a surface opposite to the one surface; a power supply including a power supply component to supply power to the integrated circuit and a power supply board on which the power supply component is mounted; a base supporting the antenna board disposed on a side of one surface of the base in such a manner that the integrated circuit is connected to the one surface, supporting the power supply board disposed on a side of an other surface which is a surface of the base opposite to the one surface in such a manner that the power supply component is connected to the other surface, and to the base heat generated by the integrated circuit and the power supply component connected to the base being transferred; a mount supporting the base in such a manner that the power supply board faces one surface of the mount, being fixed to a moving body on a side of an other surface which is a surface of the mount opposite to the one surface, and to the mount heat being transferred from the base; a radome to house the array antenna, the power supply, and the base, the radome being attached to the mount; and a skirt provided on an outer surface of the mount between the radome and the moving body, the skirt dissipating heat transferred from the mount.

Advantageous Effects of Invention

According to the antenna device of the present disclosure, higher heat dissipation performance than before can be obtained without increasing the height of the antenna device.

Embodiments of the present invention is described in detail below with reference to the drawings.

FIRST EMBODIMENT

Figure 1:
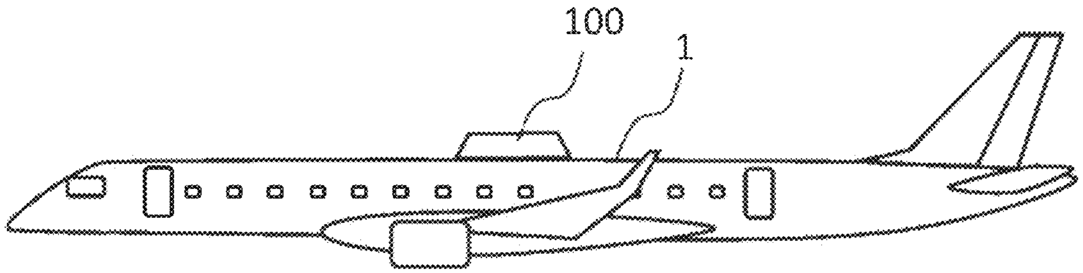
FIG. 1 is a side view of a moving body on which an antenna device according to a first embodiment is mounted.

FIG. 1 is a side view of a moving body 1 on which an antenna device 100 according to a first embodiment is mounted. Antenna device 100 is mounted on moving body 1 such as an aircraft for satellite communication. Antenna device 100 is attached to, for example, an upper surface of the aircraft as illustrated in FIG. 1. In the following description, antenna device 100 is mounted on an aircraft that is an example of moving body 1. Antenna device 100 may be mounted on another type of moving body 1. When being mounted on another type of moving body 1, antenna device 100 is attached to a surface of moving body 1 such as an upper face or a side face of moving body 1 where antenna device 100 can transmit and receive radio waves to and from a satellite. Antenna device 100 includes mainly an array antenna 2, a power supply 3, a base 4, a mount 5, a radome 6, and a skirt 7. Array antenna 2 transmits and receives radio waves. Power supply 3 supplies power to array antenna 2. Base 4 is a member that supports array antenna 2 and power supply 3. Mount 5 is a member that fixes base 4 to moving body 1. Radome 6 is a member that covers the top of mount 5 and protects array antenna 2, power supply 3, and base 4. Skirt 7 is provided at a position outside mount 5 and between mount 5 and moving body 1. The outer shape of the lower portion of antenna device 100 is determined by the outer shape of skirt 7. Skirt 7 has an outer shape that reduces the air resistance. Skirt 7 is connected to the lower side of radome 6 without leaving any space therebetween, and is provided all around mount 5. Skirt 7 makes antenna device 100 to have a shape that reduces air resistance in the lower portion of antenna device 100, and dissipates heat generated in antenna device 100.

Figure 2:
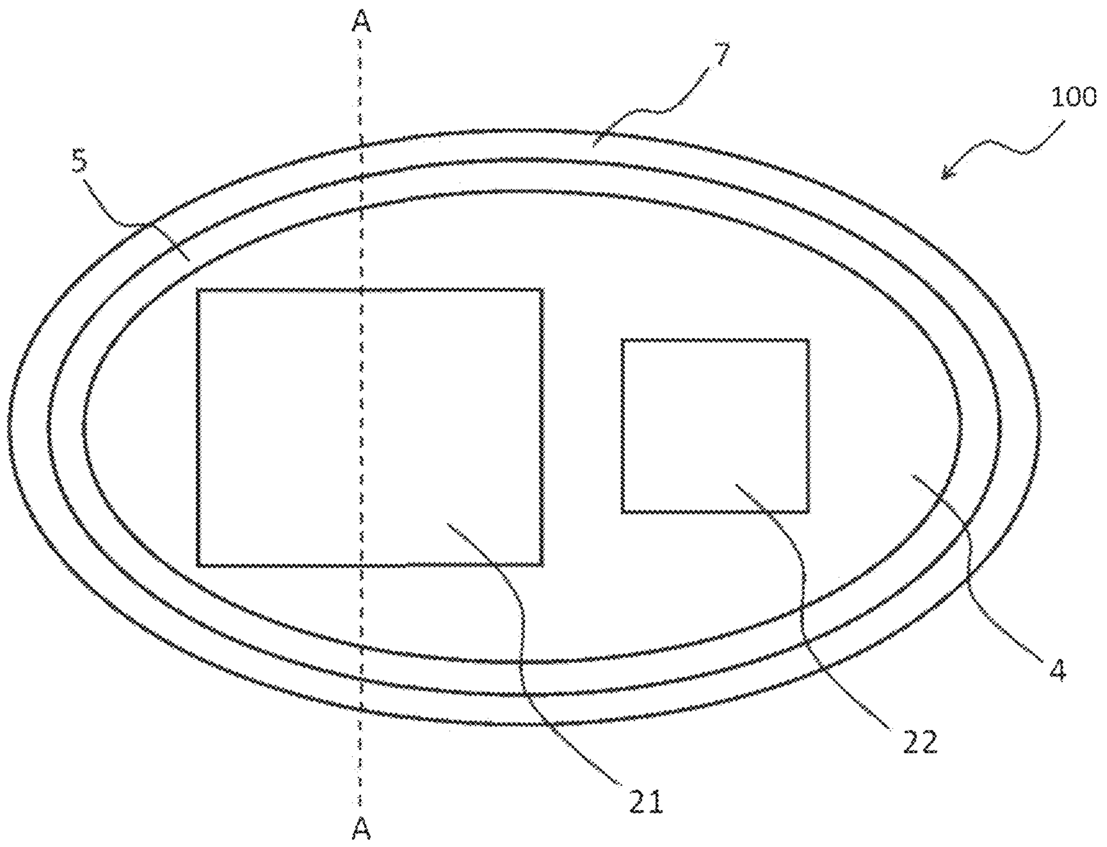
FIG. 2 is a plan view of the antenna device according to the first embodiment in a state in which a radome is removed.
Figure 3:
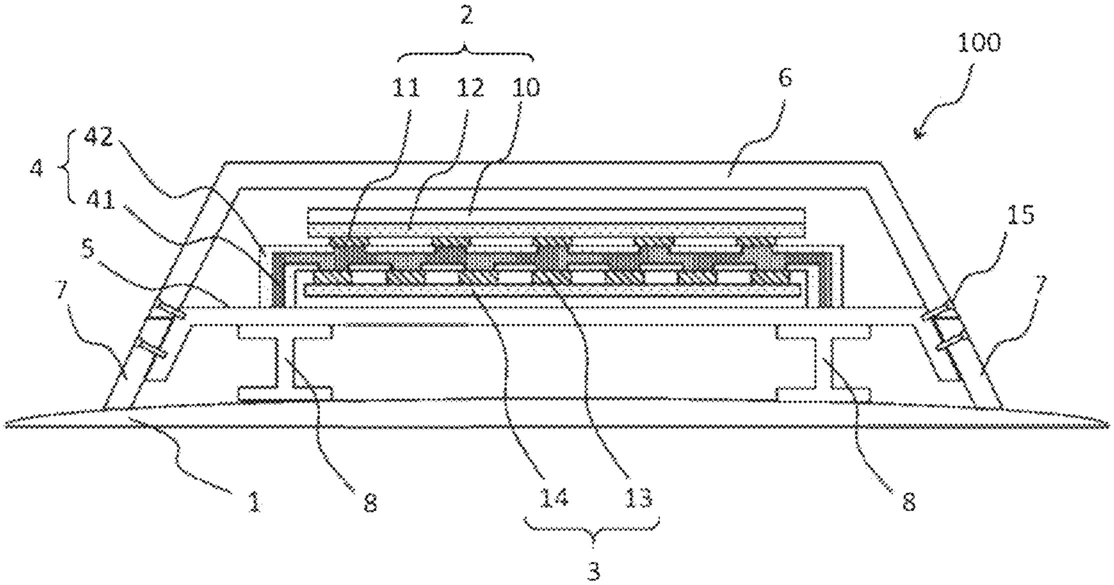
FIG. 3 is a cross-sectional view of the antenna device according to the first embodiment in a cross section perpendicular to a nose direction.

FIG. 2 is a plan view of antenna device 100 in a state in which radome 6 is removed. FIG. 3 is a cross-sectional view of antenna device 100 according to the first embodiment. FIG. 3 is a cross-sectional view in a cross section perpendicular to the nose direction of moving body 1 on which antenna device 100 is mounted, and is a cross-sectional view taken along line A-A in FIG. 2.

The outer shape of radome 6 and skirt 7, that is, the outer shape of antenna device 100 is an elliptical frustum. In a plan view of antenna device 100 viewed from above, the contour of antenna device 100 is an ellipse long in the nose direction. In the cross section in FIG. 3, the conical surface of the elliptical frustum is inclined at an angle such that the width of the top surface is about 70% of the width of the bottom surface. Antenna device 100 with the shape of the elliptical frustum has a smaller area as viewed in the nose direction than that with a shape of an elliptical cylinder. Antenna device 100 with the outer shape of the elliptical frustum has smaller air resistance than that with an outer shape of, for example, an elliptical cylinder or a quadrangular cylinder. The outer shape of radome 6 is the elliptical frustum, and thus, mount 5 and base 4 are also elliptical in a plan view. The shape of the ellipse of base 4 is determined such that the short diameter is as small as possible as long as it is greater than or equal to the width of array antenna 2, and the long diameter is greater than or equal to a necessary length.

Array antenna 2 includes a reception array antenna 21 and a transmission array antenna 22. Reception array antenna 21 and transmission array antenna 22 are plate-shaped active electronic scanning array antennas. Reception array antenna 21 and transmission array antenna 22 are arranged with an interval in the nose direction, and are arranged at the center in the direction perpendicular to the nose direction. Reception array antenna 21 is arranged closer to the nose with respect to transmission array antenna 22. Reception array antenna 21 and transmission array antenna 22 are arranged in the nose direction, by which the width and area of antenna device 100 viewed in the nose direction are reduced. The width of antenna device 100 is the length of antenna device 100 in the direction perpendicular to the nose direction. Reception array antenna 21 and transmission array antenna 22 are rectangular in a plan view. Reception array antenna 21 and transmission array antenna 22 are arranged such that the longer sides of the rectangles are parallel to the nose direction.

Each of reception array antenna 21 and transmission array antenna 22 has an antenna board 12. Antenna board 12 includes a plurality of element antennas 10 mounted on a surface (one surface) far from moving body 1, and a radio frequency integrated circuit (RFIC) 11 mounted on a surface (the other surface) near moving body 1. RFIC 11 is an integrated circuit that processes radio frequency signals to operate the plurality of element antennas 10. Array antenna 2 can change the orientation direction of radio waves in any direction within a predetermined range by controlling the phase of element radio wave radiated by each of element antennas 10. Array antenna 2 tracks a satellite to communicate with. Antenna device 100 can scan electronically and communicate with an artificial satellite so as to track the artificial satellite without scanning by a mechanical drive technique.

Power supply 3 includes a power supply component 13 that supplies power to RFIC 11 and a power supply board 14 on which power supply component 13 is mounted. Power supply 3 is disposed between base 4 and mount 5. RFIC 11 included in array antenna 2 and power supply component 13 included in power supply 3 generate heat when antenna device 100 transmits and receives radio waves. RFIC 11 and power supply component 13 are components that generate a large amount of heat. RFIC 11 and power supply component 13 are mounted on different boards. Specifically, RFIC 11 is mounted on antenna board 12, and power supply component 13 is mounted on power supply board 14.

Base 4 is a member to which array antenna 2 and power supply 3 are attached. Base 4 has a plate-shaped member, and has antenna board 12 mounted on one surface of the plate-shaped member. Thus, the plate-shaped member supports antenna board 12. Power supply board 14 is provided on a surface (the other surface) opposite to the one surface of the plate-shaped member of base 4. Specifically, an upper surface (heat dissipation surface) of RFIC 11 mounted on antenna board 12 is connected to the one surface of base 4 which is a surface far from moving body 1. Power supply component 13 mounted on power supply board 14 is connected to the other surface of base 4. The other surface of base 4 is a surface near moving body 1. RFIC 11 and power supply component 13 which are heat generating components are connected separately to two different surfaces of base 4. Heat generated by RFIC 11 and heat generated by power supply component 13 can be transferred to base 4 through different paths, whereby heat can be transferred efficiently. RFIC 11 and power supply component 13 are components that generate a large amount of heat.

Base 4 includes the plate-shaped member being elliptical and a side face member having a cylindrical shape. Antenna board 12 and power supply board 14 are attached to the plate-shaped member. The side face member having the cylindrical shape connects the periphery of the plate-shaped member to mount 5. Each of antenna board 12 and power supply board 14 is fixed to base 4 with a fixture (not illustrated). An upper end of the side face member having the cylindrical shape is closed by the plate-shaped member, and a lower end is opened. Base 4 has an elliptical cylindrical shape. The lower end of the side face member of base 4 is connected to mount 5. Base 4 is supported by mount 5. Base 4 is fixed to mount 5. The plate-shaped member of base 4 may have any shape. The plate-shaped member having an elliptical shape fits to the internal space of radome 6 having a shape of elliptical frustum. Desirably, the shape of the plate-shaped member of base 4 is an elliptical shape. The plate-shaped member may have any shape such as a polygon or a circle as long as it can support antenna board 12 and power supply board 14. The side face member of base 4 may have another shape as long as it connects the periphery of the plate-shaped member and mount 5. For example, the side face member may be a plurality of members connecting the periphery of the plate-shaped member and mount 5.

Heat generated by RFIC 11 and power supply component 13 is transferred to base 4. Base 4 transfers heat transferred from RFIC 11 and power supply component 13 to mount 5. Base 4 protects RFIC 11, antenna board 12, power supply component 13, and power supply board 14 from a load applied to antenna device 100 mounted on moving body 1 externally because of vibration or the like. Base 4 is desirably made of a material having high thermal conductivity and high rigidity. Base 4 includes a first member 41 that transfers heat, and a second member 42 that supports antenna board 13 and power supply board 14.

First member 41 is connected to RFIC 11, power supply component 13, and mount 5. First member 41 is made of a material having high thermal conductivity. Being high in thermal conductivity means that the thermal conductivity of the material is greater than or equal to a predetermined value. The determined value is, for example, greater than or equal to 700 W/mK, desirably 1000 W/mK. First member 41 is made of a material having higher thermal conductivity than second member 42. First member 41 is made of a material containing graphite. Second member 42 is made of a material having higher rigidity than first member 41. Antenna board 13 and power supply board 14 are fixed to second member 42. Second member 42 supports antenna board 13 and power supply board 14 such that no load is applied to first member 41. Second member 42 is made of a material containing aluminum. Specifically, as illustrated in FIG. 2, the plate-shaped member of base 4 is formed by first member 41 in a central portion in the thickness direction (thickness central portion), portions each connecting an area of the one surface to be in contact with RFIC 11 and the thickness central portion, and portions each connecting an area of the other surface to be in contact with power supply component 13 and the thickness central portion. The side face member of base 4 is formed by first member 41 in the thickness central portion. In the plate-shaped member and the side face member of base 4, the thickness central portions formed by first member 41 are connected to each other. In the plate-shaped member and the side face member of base 4, the surfaces of first member 41 is covered with second member 42. First member 41 is exposed on the surface in the area of the one surface of the plate-shaped member of base 4 to be in contact with RFIC 11 and an area of the other surface to be in contact with power supply component 13. First member 41 forming the thickness central portion of the side face member is exposed on the side face of the side face member to be in contact with mount 5.

Graphite has a feature of having thermal conductivity about eight times higher than aluminum. In base 4, first member 41 containing graphite having high thermal conductivity connects RFIC 11 and mount 5, and connects power supply component 13 and mount 5. Base 4 functions as a heat spreader and diffuses heat generated by RFIC 11 and power supply component 13 quickly throughout first member 41. Base 4 can suppress an occurrence of temperature unevenness in RFIC 11, antenna board 12, power supply component 13, and power supply board 14. Base 4 can also transfer heat efficiently to a place distant from RFIC 11, antenna board 12, power supply component 13, and power supply board 14, which are heat sources, through first member 41 containing graphite having high thermal conductivity. Therefore, an increase in temperature of RFIC 11, antenna board 12, power supply component 13, and power supply board 14 can be suppressed, and the temperatures thereof can be appropriate. It is possible to suppress deterioration in electrical performance caused by the increase in temperatures of RFIC 11 and antenna board 12. The shortening of the life of power supply component 13 and power supply board 14 can be reduced. Graphite has a specific gravity of about 0.8 times that of aluminum. When being constructed by combining first member 41 made of a material containing graphite and the second member made of a material containing aluminum, base 4 is reduced in weight as compared with a case where entire of base 4 is made of aluminum.

On the other hand, graphite has a feature of having lower rigidity than aluminum. Therefore, entire of base 4 cannot be made of graphite. In a case where antenna device 100 is mounted on moving body 1 that generates large vibration during movement, the base formed of graphite entirely is likely to be damaged by the vibration. Base 4 has a structure in which first member 41 containing graphite is covered with second member 42 made of a material containing aluminum having higher rigidity than graphite. Compared with a base formed of graphite entirely, base 4 has a structure that is strong against an external load such as vibration applied from the outside. Base 4 can have high thermal conductivity and high rigidity because of the structure obtained by connecting first member 41 containing graphite and second member 42 containing aluminum.

Figure 4:
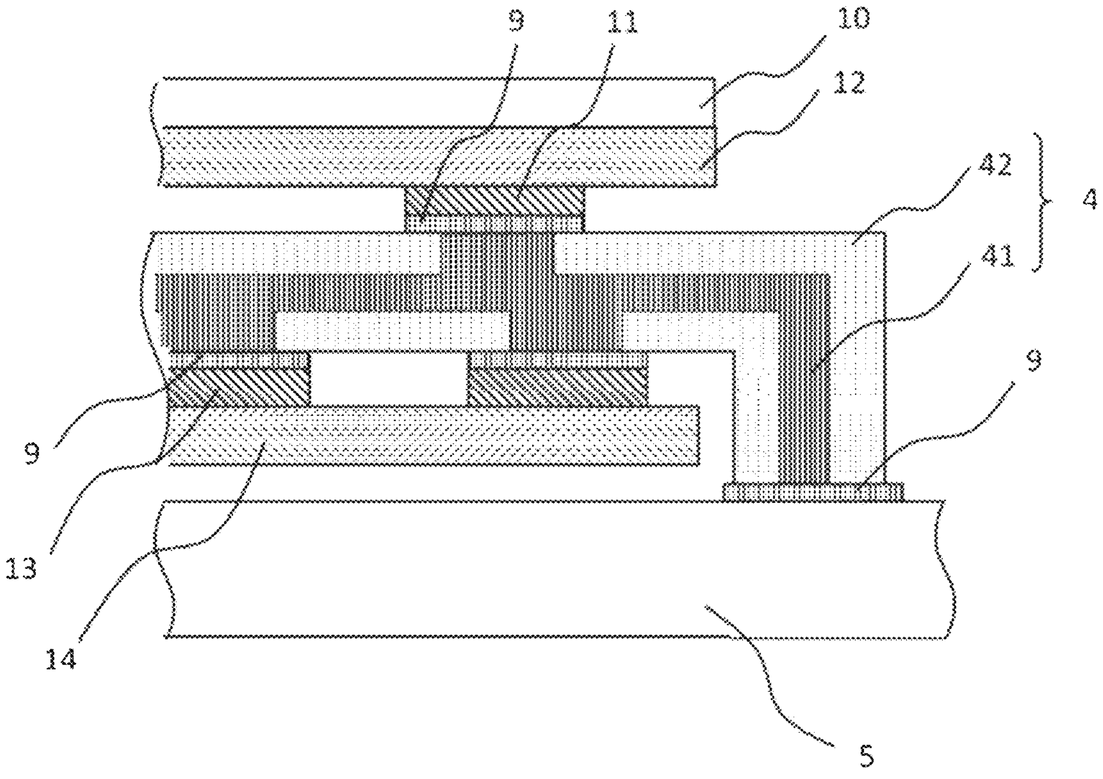
FIG. 4 is an enlarged cross-sectional view of a connection portion between a base and an integrated circuit, a connection portion between the base and a power supply component, and a connection portion between the base and a mount in the antenna device according to the first embodiment.

FIG. 4 is an enlarged cross-sectional view of a connection portion between base 4 and RFIC 11, a connection portion between base 4 and power supply component 13, and a connection portion between base 4 and mount 5 in antenna device 100 according to the first embodiment. In order to transfer heat generated by RFIC 11 and power supply component 13 to base 4 with a small thermal resistance, it is preferable that RFIC 11 and base 4 are brought into close contact with each other, and that power supply component 13 and base 4 are connected in close contact to each other. Being in close contact at the connection point means that connection is made in such a way that no air or the like enters therebetween. The connection surface between RFIC 11 and base 4 and the connection surface between power supply component 13 and base 4 are processed so as to reduce surface irregularities. Base 4 and RFIC 11 are connected in close contact to each other with a thermal interface material 9 interposed therebetween, thermal interface material 9 being in contact with base 4 and RFIC 11 without leaving any space therebetween. Thermal interface material 9 is made of a material having thermal conductivity greater than or equal to a predetermined value. Base 4 and power supply component 13 are connected in close contact to each other with thermal interface material 9 interposed therebetween, thermal interface material 9 being in contact with base 4 and power supply component 13 without leaving any space therebetween. Thermal interface material 9 can fill small unevenness between RFIC 11 and base 4 and between power supply component 13 and base 4. Thermal interface material 9 can reduce thermal resistance on the contact surface between RFIC 11 and base 4 and the contact surface between power supply component 13 and base 4.

The type of thermal interface material 9 connecting base 4 and RFIC 11 and the type of thermal interface material 9 connecting base 4 and power supply component 13 may be the same or different from each other. The determined value (required thermal conductivity value) for the thermal conductivity of thermal interface material 9 connecting base 4 and RFIC 11 and the required thermal conductivity value of thermal interface material 9 connecting base 4 and power supply component 13 may be the same or different from each other. At least one of the required thermal conductivity and the type of thermal interface material 9 may be changed for each connection portion.

Mount 5 is disposed on a side of the surface (the other surface) of base 4 to which power supply component 13 is connected. Mount 5 is fixed to moving body 1. Mount 5 supports base 4, radome 6, and skirt 7. Mount 5 supports base 4 such that power supply board 14 faces the one surface of mount 5. Mount 5 is fixed to moving body 1 on the side of the other surface which is a surface of mount 5 opposite to the one surface. Mount 5 is a member for attaching antenna device 100 to moving body 1. Mount 5 is made of a metal material having high rigidity and has a cross-sectional shape for increasing rigidity so as not to transmit the influence of disturbance caused by a vibration load, a wind load, and the like to array antenna 2. Base 4 is fixed to the upper surface of mount 5 with a fixture (not illustrated). The connection surface between base 4 and mount 5 is processed so as to reduce surface irregularities. Base 4 and mount 5 are in contact to each other without leaving any space between base 4 and the mount 5, and are connected in close contact with thermal interface material 9 interposed therebetween.

Mount 5 is a member having a shape of a low hollow elliptical frustum. An upper surface of the elliptical frustum is closed by a plate-shaped member to which base 4 is fixed, and a lower surface is opened. Mount 5 is disposed such that the plate-shaped member has a predetermined distance from moving body 1. Mount 5 is fixed to moving body 1 with a fastening hardware 8. Base 4 is attached to a surface of mount 5 far from moving body 1. Mount 5 includes the plate-shaped member which is elliptical and on which base 4 is mounted and a side face member. The side face member of mount 5 is a cylindrical member having an inclined side face. An upper end of the side face member of mount 5 is connected to a periphery of the plate-shaped member. The side face member of mount 5 has a cylindrical shape (shape of elliptical frustum) that increases in diameter from an end connected to the plate-shaped member toward a moving body 1 side end. The plate-shaped member of mount 5 may have any shape. The plate-shaped member of mount 5 may have any shape such as a polygon or a circle as long as base 4 can be mounted thereon. Because of the elliptical shape, the area of mount 5 in a plan view can be reduced, and radome 6 and skirt 7 can have a shape capable of reducing air resistance. Mount 5 has an elliptical shape in a plan view desirably. Even when the plate-shaped member of base 4 has a shape other than an ellipse in a plan view, the shape of the plate-shaped member of mount 5 is elliptical in a plan view desirably. The side face member of mount 5 may have a shape different from the cylindrical shape such as the elliptical frustum. Mount 5 may be a solid member having a shape of an elliptical frustum.

Radome 6 is attached above mount 5. Radome 6 and mount 5 form a closed space above mount 5. Array antenna 2, power supply 3, and base 4 are housed in the closed space. Radome 6 is provided to protect array antenna 2, power supply 3, and base 4. Radome 6 is disposed so as to cover a side of mount 5 on which base 4 is provided. Radome 6 protects array antenna 2, power supply 3, and base 4 from external environments such as hot air, cold air, rain, and wind outside radome 6. Radome 6 is made of a material having a high dielectric constant and a high dielectric loss tangent so as to transmit radio waves. Radome 6 is strong enough to protect array antenna 2, power supply 3, and base 4 from an external environment such as wind load and collision of foreign matters. Radome 6 has a necessary and sufficient thickness to withstand an assumed load.

Radome 6 has a shape of a hollow elliptical frustum with a closed upper end and an open lower end. Radome 6 includes a flat member that is an upper surface and a side face member connected to a lower side of the flat member. The side face member of radome 6 is a cylindrical member having an inclined side face. The diameter of the side face member of radome 6 increases from the closed upper end toward the open lower end. Radome 6 is provided on the outer surface of mount 5. The side face member of radome 6 is connected to the side face member of mount 5 at an inclination angle same as the inclination angle of the side face member of mount 5. At least one of the side face member of mount 5 and the side face member of radome 6 may vary in inclination angle depending on height.

Radome 6 is fixed to mount 5 by a fastening component 15. A part of the upper side (the side on which base 4 is provided) of mount 5 is fitted into radome 6. Radome 6 and mount 5 form the closed space in which array antenna 2, power supply 3, and base 4 are placed. The lower side (the side opposite to the side on which base 4 is provided) of mount 5 protrudes from radome 6. The inner surface of radome 6 at the open end is fixed to the side face member that becomes the outer surface of mount 5. The side face member of mount 5 has a face to which the inner surface of radome 6 is attached and a face formed outside radome 6. Mount 5 may have a structure to be fitted into radome 6 entirely. In this case, the side face member of mount 5 is attached to the inner surface of radome 6 entirely. Fastening component 15 is attached from the outside of radome 6 toward mount 5. Fastening component 15 fastens radome 6 and mount 5, and is a bolt, a rivet, or the like. Fastening component 15 is provided with anti-loosing measures so as not to be loosened by a load or vibration during flight of moving body 1. Since radome 6 is fixed to mount 5 in this manner, the detachment of radome 6 from mount 5 is prevented even when moving body 1 is subjected to loads caused by disturbance during movement.

Figure 5:
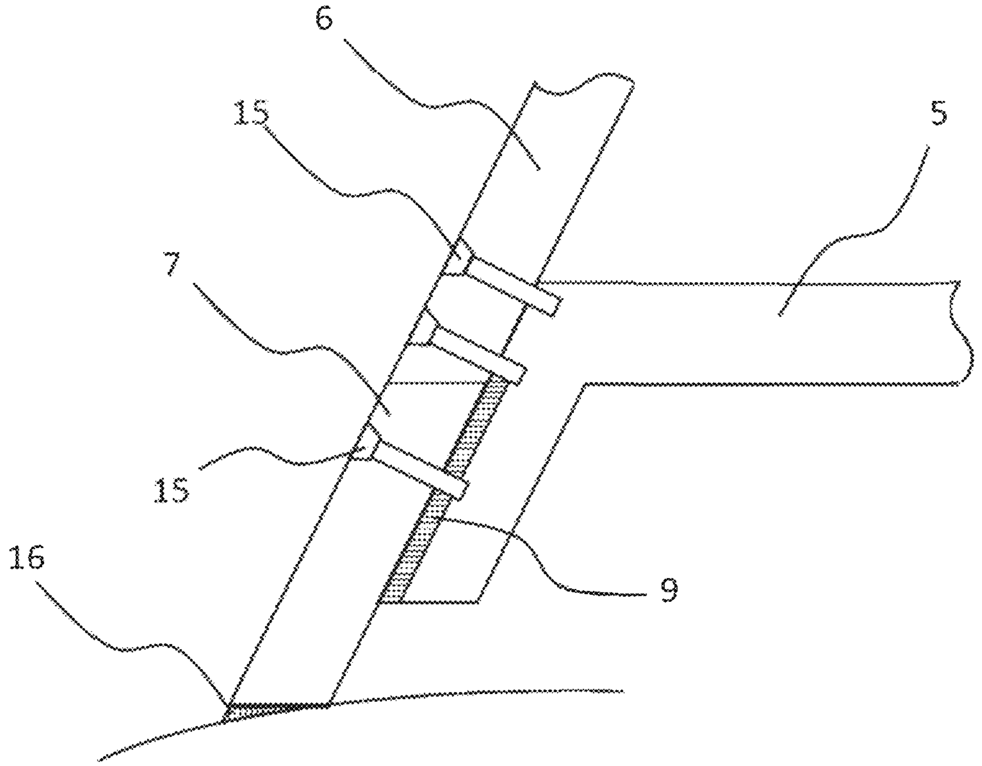
FIG. 5 is an enlarged cross-sectional view of a connection portion between a skirt and the mount of the antenna device according to the first embodiment.

FIG. 5 is an enlarged cross-sectional view of a connection portion between skirt 7 and mount 5 of antenna device 100 according to the first embodiment. Skirt 7 is a member provided between moving body 1 and radome 6 in order to reduce the air resistance of antenna device 100. Skirt 7 is provided on the outer surface of mount 5 between radome 6 and moving body 1. Skirt 7 dissipates heat transferred from mount 5. Skirt 7 has a shape fitting to a shape of a portion of mount 5 to which skirt 7 is attached. Skirt 7 has a shape of a hollow elliptical frustum. Skirt 7 includes a side face having a shape similar to the shape of the side face member that is the outer surface of mount 5, an end face connected to the open lower end of radome 6, and an end face connected to the surface of moving body 1. An inner surface of skirt 7 is connected to the outer surface of mount 5. The upper end face (one end) of skirt 7 is connected to the open lower end of radome 6. The lower end face (other end) of skirt 7 is connected to the surface of moving body 1 so as to fit to the curved surface on the surface of moving body 1. Skirt 7 is provided so as to cover the surface of the side face member of mount 5 formed outside radome 6. Skirt 7 is fixed to mount 5 by fastening component 15. Fastening component 15 is attached from the outside of skirt toward mount 5. Fastening component 15 is a bolt, a rivet, or the like. Since skirt 7 is fixed to mount 5 in this manner, the detachment of skirt 7 from mount 5 is prevented even when moving body 1 is subjected to loads caused by disturbance during movement.

Since radome 6 and skirt 7 have a shape of an elliptical conical surface with inclining side faces, air resistance can be reduced even when moving body 1 moves at a high speed, as compared with a structure having a side face that is not inclined. The shape of side faces of radome 6 and skirt 7 is made to be such that an increase in air resistance caused by mounting antenna device 100 is minimized. Antenna device 100 can reduce the increase in air resistance, and can suppress transmission of vibration caused by a vibration load, a wind load, or the like to array antenna 2.

Skirt 7 is provided on a surface of the side face member of mount 5 formed outside radome 6. Skirt 7 may have another structure as long as it is provided between radome 6 and moving body 1. Mount 5 and skirt 7 are connected in close contact to each other via thermal interface material 9 described above. Mount 5 and skirt 7 are connected in close contact via thermal interface material 9, which is in contact with mount 5 and skirt 7 without leaving any space therebetween and is made of a material having thermal conductivity greater than or equal to a predetermined value.

Skirt 7 is attached to moving body 1 via an elastic material 16 such as rubber. Elastic material 16 is a member for filling a small gap between skirt 7 and moving body 1. Elastic material 16 allows that skirt 7 and moving body 1 are connected in close contact. Therefore, it is possible to prevent wind that antenna device 100 receives during the operation of the moving body from entering into antenna device 100 through between skirt 7 and moving body 1, and to prevent antenna device 100 from being subjected to lift caused by the wind entering into antenna device 100. It also prevents water or the like from entering into antenna device 100 through between skirt 7 and moving body 1.

Figure 6:
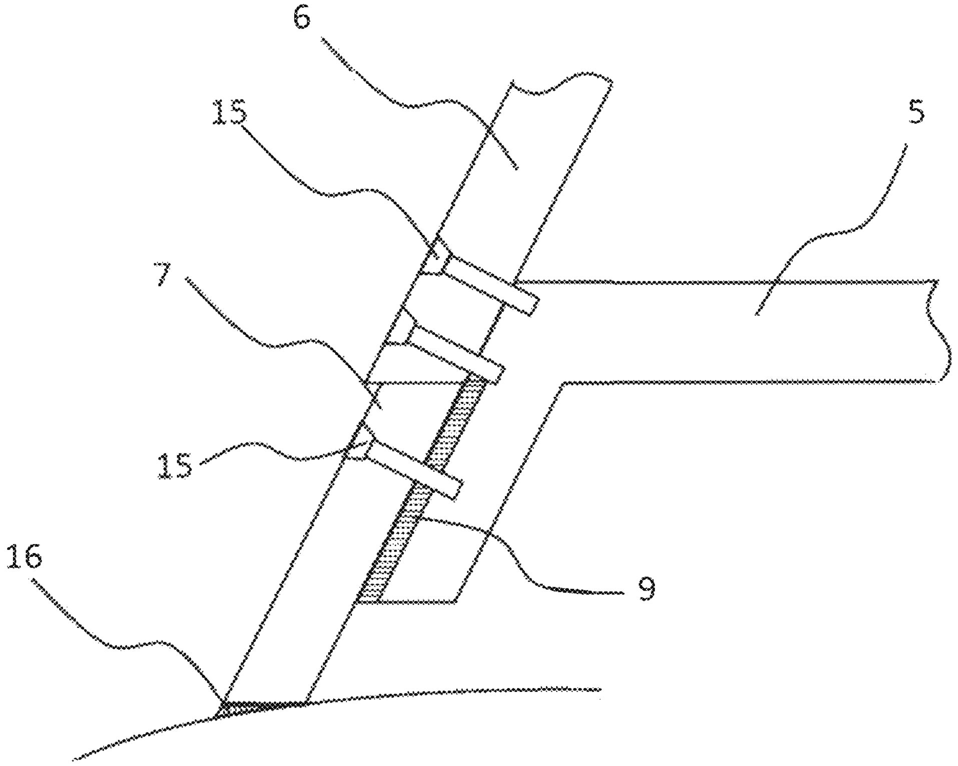
FIG. 6 is an enlarged cross-sectional view of the connection portion between the skirt and the mount of the antenna device according to a modification of the first embodiment.

As illustrated in FIG. 5, the outer surface of skirt 7 and the outer peripheral surface of the radome 6 are disposed so that there are no level difference between them. With this structure, no level difference is formed on the outer surface of antenna device 100, whereby the air resistance can be reduced. As illustrated in FIG. 6, the outer surface of skirt 7 may be located slightly inside the outer surface of radome 6. This structure can also reduce the air resistance similarly, because the step on the outer surface is small. Skirt 7 is made of, for example, metal having high thermal conductivity such as aluminum. Skirt 7 may have a radiating fin on the outer surface in order to increase an area of skirt 7 in contact with cool air outside moving body 1. For example, a plurality of slits may be formed in the outer surface of skirt 7 as radiating fins.

Figure 7:
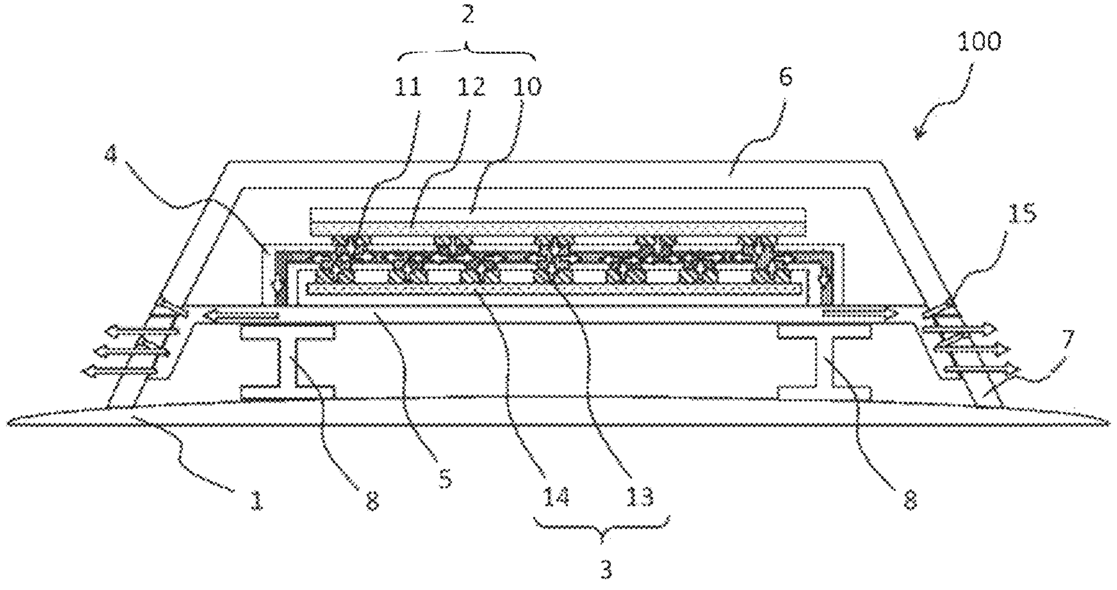
FIG. 7 is a diagram illustrating a flow of heat in the antenna device according to the first embodiment.

FIG. 7 is a diagram illustrating a flow of heat in antenna device 100. Arrows in FIG. 7 indicate the direction of flow of heat. Heat generated by RFIC 11 and power supply component 13 is transferred to base 4 through different paths. The heat transferred to base 4 is diffused throughout base 4 mainly through first member 41 of base 4 and transferred to mount 5. The heat transferred from base 4 to mount 5 is diffused throughout mount 5 and transferred to skirt 7. The heat transferred to skirt 7 is released to the outside of radome 6. Skirt 7 serves as a heat dissipation portion for releasing heat generated by RFIC 11 and power supply component 13 to the outside of radome 6.

In antenna device 100, RFIC 11 and power supply component 13, which generate a large amount of heat, are mounted separately on antenna board 12 and power supply board 14 which are different from each other. Antenna board 12 and power supply board 14 are connected to base 4 having high thermal conductivity. In antenna device 100, heat generated by RFIC 11 and power supply component 13 can be transferred to mount 5 via base 4 efficiently. Heat is transferred from mount 5 to skirt 7, and skirt 7 dissipates heat to the outside air. Heat generated by RFIC 11 and power supply component 13 can be dissipated to the outside of radome 6 efficiently without providing a cooling device such as a fan inside radome 6. When antenna device 100 is mounted on an aircraft, radome 6 is necessary. RFIC 11 and power supply component 13 are sealed inside radome 6 and are not exposed to the outside air directly. It is difficult to dissipate heat to moving body 1 from RFIC 11 and power supply component 13 due to restrictions of outfitting. In such a case, antenna device 100 can also dissipate heat generated by RFIC 11 and power supply component 13 efficiently to the outside through base 4, mount 5, and skirt 7. Antenna device 100 provides higher heat dissipation performance than before. Since antenna device 100 does not include components only for cooling, the height of antenna device 100 does not increase. Base 4 has a structure obtained by combining first member 41 containing graphite and second member 42 containing aluminum. With this configuration, base 4 has high thermal conductivity and high rigidity. Since heat is transferred from base 4 to skirt 7 and dissipated by skirt 7, wind blowing to moving body 1 during operation can be used for cooling antenna device 100. In a case where moving body 1 is an aircraft, the temperature of air outside moving body 1 is lower as the altitude at which moving body 1 flies is higher, whereby the cooling efficiency is improved.

SECOND EMBODIMENT

Figure 8:
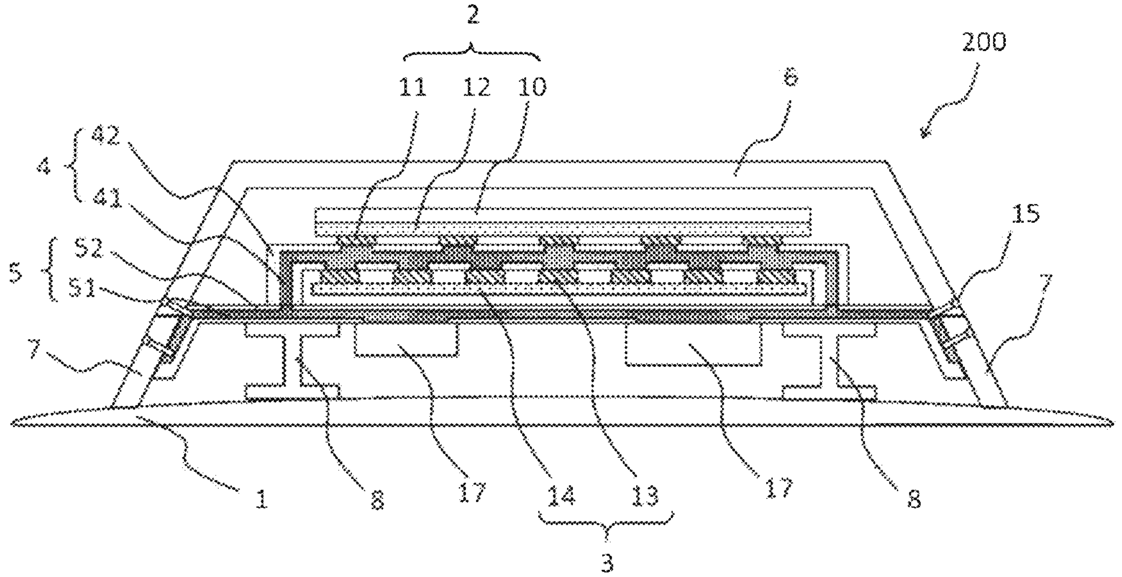
FIG. 8 is a cross-sectional view of an antenna device according to a second embodiment in a cross section perpendicular to the nose direction.

FIG. 8 is a cross-sectional view of an antenna device 200 according to a second embodiment in a cross section perpendicular to the nose direction. The cross section is the same in position as that in FIG. 3, and is taken along line A-A in FIG. 2. Antenna device 200 differs from antenna device 100 according to the first embodiment in the structure of mount 5. The other configurations are substantially the same. Hereinafter, the same reference numerals are given to the same or corresponding components as those described in the above-described embodiment, and the descriptions thereof is not repeated.

In antenna device 200 according to the second embodiment, mount 5 is disposed with a space from the surface of moving body 1. A component 17 that generates heat is disposed in contact with a surface of mount 5 near moving body 1. Component 17 may be any of a component constituting antenna device 200, a component of a device related to antenna device 200, and a component of a device not related to antenna device 200. A plurality of components 17 may be disposed. Heat generated by component 17 is transferred to mount 5. The surface of mount 5 near moving body 1 and component 17 are disposed in contact with each other so that heat can be transferred efficiently. Although not illustrated, mount 5 and component 17 may be connected via thermal interface material 9, which is in contact with mount 5 and component 17 without leaving any space therebetween and is made of a material having thermal conductivity greater than or equal to a predetermined value. Mount 5 transfers heat transferred from component 17 to skirt 7.

Mount 5 is made of a material containing graphite to increase thermal conductivity. As illustrated in FIG. 8, mount 5, like base 4, has a structure obtained by combining a third member 51 containing graphite and a fourth member 52 containing aluminum. Mount 5 includes third member 51 that transfers heat, and fourth member 52 that supports base 4, radome 6, and skirt 7. Third member 51 is in contact with first member 41 of base 4, component 17, and skirt 7. Third member 51 is made of a material having high thermal conductivity. The thermal conductivity of third member 51 is higher than the thermal conductivity of fourth member 52. Third member 51 is made of a material containing graphite. Fourth member 52 supports base 4, radome 6, and skirt 7, and is made of a material having higher rigidity than third member 51. Each of base 4, radome 6, and skirt 7 is fixed to fourth member 52 of mount 5 so that no load is applied to third member 51. Fourth member 52 is made of a material containing aluminum.

Specifically, as illustrated in FIG. 8, the plate-shaped member of mount 5 is formed by third member 51 in a thickness central portion, portions each connecting the thickness central portion and an area of the one surface to be in contact with base 4, and portions each connecting the thickness central portion and an area of the other surface to be in contact with component 17. In the side face member of mount 5, a portion (thickness outer portion) having a predetermined thickness in an area of the outer surface to be in contact with skirt 7 is formed by third member 51. The thickness central portion of the plate-shaped member of mount 5 and the thickness outer portion of the side face member are in contact with each other. In the plate-shaped member and the side face member of mount 5, the surfaces of third member 51 is covered with fourth member 52. Third member 51 is exposed on the surface in the area of the one surface of the plate-shaped member of mount 5 to be in contact with base 4 and the area of the other surface to be in contact with component 17. In the area of the outer surface of the side face member to be in contact with skirt 7, third member 51 is exposed on the surface.

Figure 9:
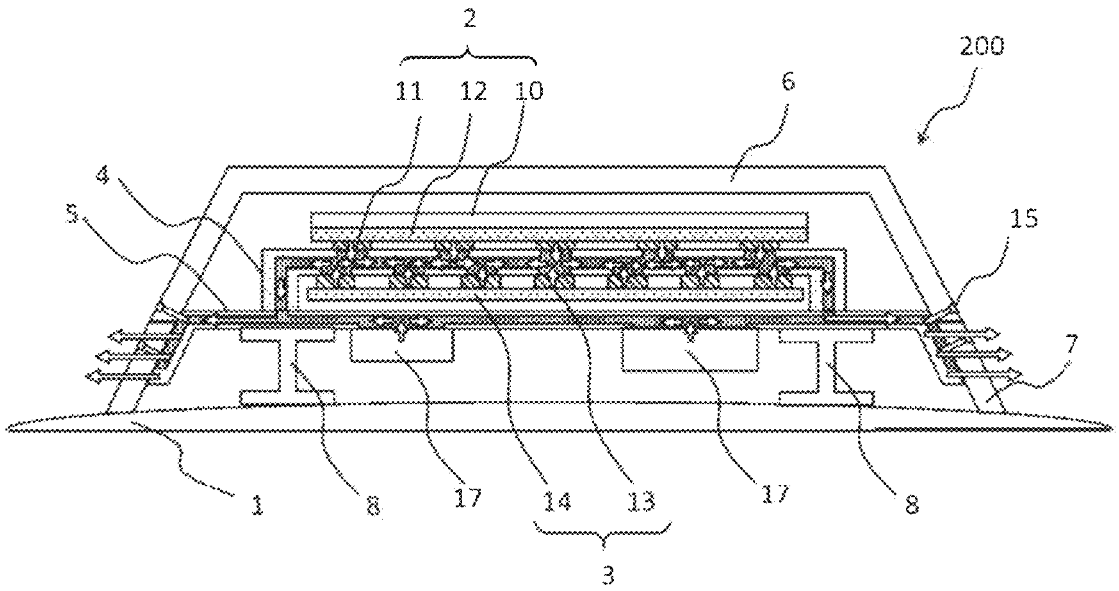
FIG. 9 is a diagram illustrating a flow of heat in the antenna device according to the second embodiment.

FIG. 9 is a diagram illustrating a flow of heat in antenna device 200. Arrows in FIG. 9 indicate the direction of flow of heat. Heat generated by RFIC 11 and power supply component 13 is transferred to base 4 through different paths. The heat transferred to base 4 is diffused throughout base 4 mainly through first member 41 of base 4 and transferred to mount 5. Heat generated by component 17 is transferred to mount 5. The heat transferred to mount 5 is diffused throughout mount 5 mainly through third member 51 of mount 5, and transferred to skirt 7 outside radome 6. The heat transferred to skirt 7 is released to the outside air. Skirt 7 serves as a heat dissipation portion for releasing heat generated by RFIC 11, power supply component 13, and component 17 to the outside of radome 6.

Antenna device 200 has the same configuration as antenna device 100 regarding RFIC 11, power supply component 13, and base 4, and also has the same flow of heat as that of antenna device 100. In antenna device 200, third member 51 of mount 5 is also connected to component 17. Mount 5 has a structure including third member 51 made of a material having high thermal conductivity and fourth member 52 made of a material having higher rigidity than third member 51. Mount 5 transfers heat transferred from base 4 to skirt 7, and dissipates the heat to the outside air by skirt 7.

Component 17 that generates a large amount of heat is disposed on the surface (the other surface) of mount 5 near moving body 1. A heat generating device instead of a heat generating component may be disposed on the other surface of mount 5. It is only sufficient that a heat generating element that is a component or a device generating heat is connected to the other surface of mount 5. Heat is transferred from the heat generating element to mount 5, and the heat transferred to mount 5 is transferred to skirt 7. Skirt 7 also dissipates heat generated by the heat generating element to the outside air. A space between mount 5 and moving body 1 can be used effectively by disposing component 17 in the space. Mount 5 has a structure having high thermal conductivity, whereby heat generated by component 17 can be transferred to skirt 7 efficiently.

Even when not connected to the heat generating element, mount 5 may have a structure including third member 51 made of a material having high thermal conductivity and fourth member 52 made of a material having higher rigidity than third member 51. In this case, third member 51 is in contact with base 4 and skirt 7. Specifically, in the plate-shaped member of mount 5, a thickness central portion and portions each connecting the thickness central portion and an area to be in contact with base 4 are formed by third member 51. In the side face member of mount 5, a thickness central portion and portions each connecting the thickness central portion and an area to be in contact with skirt 7 are formed by third member 51. In the plate-shaped member and the side face member of mount 5, the thickness central portions formed by third member 51 are connected to each other. In the plate-shaped member and the side face member of mount 5, the surfaces of third member 51 is covered with fourth member 52.

It is possible to combine freely the above embodiments, modify the above embodiments, omit some components, or combine freely embodiments which have been modified or in which some components have been omitted.

REFERENCE SIGNS LIST

1: moving body, 2: array antenna, 21: reception array antenna, 22: transmission array antenna, 3: power supply, 4: base, 5: mount, 6: radome, 7: skirt, 8: fastening hardware, 9: thermal interface material, 10: element antenna, 11: RFIC (integrated circuit), 12: antenna board, 13: power supply component, 14: power supply board, 15: fastening component, 16: elastic material, 17: component, 100, 200: antenna device

The invention claimed is:

1. An antenna device comprising:

an array antenna including a plurality of element antennas, an integrated circuit to operate the plurality of element antennas, and an antenna board on which the plurality of element antennas is mounted on one surface and the integrated circuit is mounted on an other surface that is a surface opposite to the one surface;

a power supply including a power supply component to supply power to the integrated circuit and a power supply board on which the power supply component is mounted;

a base supporting the antenna board disposed on a side of one surface of the base in such a manner that the integrated circuit is connected to the one surface, supporting the power supply board disposed on a side of an other surface which is a surface of the base opposite to the one surface in such a manner that the power supply component is connected to the other surface, and to the base heat generated by the integrated circuit and the power supply component connected to the base being transferred;

a mount supporting the base in such a manner that the power supply board faces one surface of the mount, being fixed to a moving body on a side of an other surface which is a surface of the mount opposite to the one surface, and to the mount heat being transferred from the base;

a radome to house the array antenna, the power supply, and the base, the radome being attached to the mount; and a skirt provided on an outer surface of the mount between the radome and the moving body, the skirt dissipating heat transferred from the mount.

2. The antenna device according to claim 1, wherein the base includes: a first member being in contact with the integrated circuit, the power supply component, and the mount, and being made of a material having thermal conductivity greater than or equal to a predetermined value; and a second member supporting the antenna board and the power supply board, and being made of a material having higher rigidity than the first member.

3. The antenna device according to claim 2, wherein the first member is made of a material containing graphite.

4. The antenna device according to claim 2, wherein the second member is made of a material containing aluminum.

5. The antenna device according to claim 1, wherein the mount includes: a third member being in contact with the base and the skirt, and being made of a material having thermal conductivity greater than or equal to a predetermined value; and a fourth member supporting the base, the radome, and the skirt, and being made of a material having higher rigidity than the third member.

6. The antenna device according to claim 5, wherein the third member is made of a material containing graphite.

7. The antenna device according to claim 5, wherein the fourth member is made of a material containing aluminum.

8. The antenna device according to claim 1, wherein the other surface of the mount is in contact with a heat generating element, the heat generating element being a device or a component generating heat, and the mount transferring heat transferred from the heat generating element to the skirt.

9. The antenna device according to claim 8, wherein the mount includes: a third member being in contact with the heat generating element, the base, and the skirt, and being made of a material having thermal conductivity greater than or equal to a predetermined value; and a fourth member supporting the heat generating element, the base, the radome, and the skirt, and being made of a material having higher rigidity than the third member.

10. The antenna device according to claim 8, wherein the mount and the heat generating element are connected to each other with a fifth thermal interface material interposed between the mount and the heat generating element, the fifth thermal interface material being in contact with the mount and the heat generating element without leaving any space, and being made of a material having thermal conductivity greater than or equal to a predetermined value.

11. The antenna device according to claim 1, wherein the base and the integrated circuit are connected to each other with a first thermal interface material interposed between the base and the integrated circuit, the first thermal interface material being in contact with the base and the integrated circuit without leaving any space, and being made of a material having thermal conductivity greater than or equal to a predetermined value, and the base and the power supply component are connected to each other with a second thermal interface material interposed between the base and the power supply component, the second thermal interface material being in contact with the base and the power supply component without leaving any space, and being made of a material having thermal conductivity greater than or equal to a predetermined value.

12. The antenna device according to claim 1, wherein the base and the mount are connected to each other with a third thermal interface material interposed between the base and the mount, the third thermal interface material being in contact with the base and the mount without leaving any space, and being made of a material having thermal conductivity greater than or equal to a predetermined value, and the mount and the skirt are connected to each other with a fourth thermal interface material interposed between the mount and the skirt, the fourth thermal interface material being in contact with the mount and the skirt without leaving any space, and being made of a material having thermal conductivity greater than or equal to a predetermined value.

* * * * *